United States Patent
Kienzle

(10) Patent No.: US 10,452,040 B2
(45) Date of Patent: Oct. 22, 2019

(54) GRAPH-BASED DATA ANALYSIS FOR SENSOR NETWORKS

(71) Applicant: SAP SE, Walldorf (DE)

(72) Inventor: Stefan Kienzle, St. Leon-Rot. (DE)

(73) Assignee: SAP SE, Walldorf (DE)

( * ) Notice: Subject to any disclaimer, the term of this patent is extended or adjusted under 35 U.S.C. 154(b) by 307 days.

(21) Appl. No.: 15/381,710

(22) Filed: Dec. 16, 2016

(65) Prior Publication Data

US 2018/0173184 A1 Jun. 21, 2018

(51) Int. Cl.
| | | |
|---|---|---|
| *G05B 19/048* | (2006.01) | |
| *G05B 13/04* | (2006.01) | |
| *H04L 29/08* | (2006.01) | |
| *H04L 12/24* | (2006.01) | |
| *G05B 19/042* | (2006.01) | |
| *G05B 19/418* | (2006.01) | |

(52) U.S. Cl.
CPC ....... *G05B 19/042* (2013.01); *G05B 19/4185* (2013.01); *G05B 19/0425* (2013.01); *G05B 19/0428* (2013.01); *G05B 2219/24103* (2013.01)

(58) Field of Classification Search
CPC .................... G05B 19/042; G05B 2219/24103
USPC .......................................................... 700/9
See application file for complete search history.

(56) References Cited

U.S. PATENT DOCUMENTS

| | | |
|---|---|---|
| 8,024,059 B2 | 9/2011 | Kienzle |
| 8,155,772 B2 | 4/2012 | Kienzle |
| 8,239,054 B2 | 8/2012 | Kienzle |
| 8,886,470 B2 | 11/2014 | Kienzle |
| 9,443,215 B2 | 9/2016 | Kienzle |
| 2010/0169140 A1 | 7/2010 | Kienzle |
| 2011/0029345 A1 | 2/2011 | Kienzle |
| 2013/0151303 A1 | 6/2013 | Kienzle |
| 2017/0033899 A1* | 2/2017 | Rakib .................. H04L 5/0007 |
| 2018/0124789 A1* | 5/2018 | Yerramalli ............. H04W 4/70 |
| 2018/0219412 A1* | 8/2018 | Neubacher ............... H02J 3/14 |
| 2018/0316376 A1* | 11/2018 | Kim ...................... H04W 28/02 |

* cited by examiner

*Primary Examiner* — Ly D Pham
(74) *Attorney, Agent, or Firm* — Fish & Richardson P.C.

(57) ABSTRACT

Techniques are described for graph-based analysis of data generated on sensor networks, such as Internet-of-Things (IoT) networks. Data may be collected from various computing devices, or sensors, on a network. The data is discretized and analyzed to provide a graphical representation of at least a portion of the data. In some instances, the graph may be determined based on various relationships between nodes that correspond to discrete portions of the data, and the relationships between nodes may be time-based correlations between the data of the nodes. The graph accumulates, compresses, and organizes the data to enable efficient data visualization, analysis, alert generation, and/or other activities. A previously generated version of a graph may be compared to a current version to identify a changing situation, such as new usage of the monitored devices, failure or anomalous behavior of the devices, and so forth.

20 Claims, 5 Drawing Sheets

GRAPH-BASED DATA ANALYSIS FOR SENSOR NETWORKS

BACKGROUND

Recently, there has been a dramatic increase in the number of appliances, devices, vehicles, and/or other types of objects that include data collection, computing, sensing, and/or network communications capabilities in addition to their normal functionality. These objects, described as smart appliances, smart vehicles, smart buildings, smart infrastructure components, and so forth, may be organized into an Internet of Things (IoT), through which the objects may generate and exchange data. An IoT may enable objects on the IoT, also referred to as IoT devices, to be sensed and controlled remotely over network(s). The data generated by the objects may be collected, analyzed, or otherwise processed by computing devices and/or individuals. Traditionally, the data generated by IoT devices is transmitted over one or more networks to a central processing server, which collects and stores the raw data. Algorithms may then execute to analyze the data. Thus, the volume of raw data that is generated by IoT devices, communicated over network(s), persisted in data storage, and analyzed increases rapidly, depending on the sampling rate, as the number of data generating IoT devices increase. At least some of the collected and stored raw data may not be relevant to the subsequent analysis, leading to an unnecessary expenditure of network capacity, storage space, and/or other computing resources. Accordingly, the large and ever-increasing quantity of data generated by IoT devices poses a challenge, given the limited capacity of traditional systems to communicate, store, and process the data.

SUMMARY

Implementations of the present disclosure are generally directed to analyzing data generated through a network of devices. More specifically, implementations are directed to a graph-based analysis of data generated on sensor networks, such as Internet-of-Things (IoT) networks.

In general, innovative aspects of the subject matter described in this specification can be embodied in methods that include actions of: receiving data generated by each of a plurality of devices; determining based on the data, a graph that includes nodes and edges connecting pairs of nodes, wherein: each of the nodes corresponds to a different value, or a different range of values, of the data; each of the edges connects a pair of nodes for which corresponding values, or ranges of values, are present in the data during a same time period; and each of the edges is associated with a counter value that indicates a number of time periods during which the corresponding values, or ranges of values, are present in the data; identifying, based on the graph, a typical operating mode of the plurality of devices, the typical operating mode including a set of values corresponding to nodes for which the connecting edges exhibit a highest counter value; and storing the typical operating mode in data storage.

Implementations can optionally include one or more of the following features: each of the plurality of devices generates a different type of the data; the plurality of devices are components of a machine and are configured to generate the data that describes a plurality of attributes of the machine; the actions further include discretizing the data according to a plurality of time periods; the actions further include storing the graph in the data storage; the actions further include receiving updated data generated by each of the plurality of devices; the actions further include determining, based on the updated data, an updated version of the graph; the actions further include in response to determining that the updated version of the graph exhibits the typical operating mode that differs compared to the stored typical operating mode, sending at least one alert; the at least one alert is sent in response to determining that the updated version of the graph exhibits the typical operating mode that differs by at least a predetermined threshold value compared to the stored typical operating mode; the at least one alert indicates at least one current data value that is different than a corresponding data value included in the stored typical operating mode; the plurality of devices is a plurality of IoT devices.

Other implementations of any of the above aspects include corresponding systems, apparatus, and computer programs that are configured to perform the actions of the methods, encoded on computer storage devices. The present disclosure also provides a computer-readable storage medium coupled to one or more processors and having instructions stored thereon which, when executed by the one or more processors, cause the one or more processors to perform operations in accordance with implementations of the methods provided herein. The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

Implementations provide various technical advantages and improvements over traditional systems. Traditionally, systems that collect and process IoT data are configured to store the data in a centralized data storage, from which the data is retrieved for analysis and/or communication to other systems. Given the large and ever-increasing quantity of data generated by an IoT network, traditional systems are required to regularly add storage devices, processing capacity, and/or other computing resources in an attempt to keep up with the increasing amount of data. Accordingly, traditional systems for handling IoT data are not scalable as the amount of processed data increases over time. Implementations address this shortcoming in traditional systems by organizing the collected data in a graphical form, e.g., as a graph, for subsequent analysis and use. Accordingly, implementations consume less data storage than traditional systems that store large amounts of collected raw data. Through use of the graph, implementations also enable insights into the data to be generated more quickly and efficiently than traditional systems, thus consuming less processing capacity and active memory than traditional systems. Implementations also consume less network capacity given that a smaller amount of the data may be transmitted over networks compared to traditional systems. Implementations may determine the operating mode of a device based on a combination of multiple sensor data values, and may determine the operating mode directly without the need for further processing. In addition, the spread and/or distribution of the sensor data (e.g., from minimum to maximum) may be available directly, in real time as the data is collected. Implementations also facilitate the identification of deviations based on comparison between current graphs and historical graphs, which may be used for monitoring with alerting or trend identification.

It is appreciated that aspects and features in accordance with the present disclosure can include any combination of the aspects and features described herein. That is, aspects and features in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DETAILED DESCRIPTION

Figure 1:
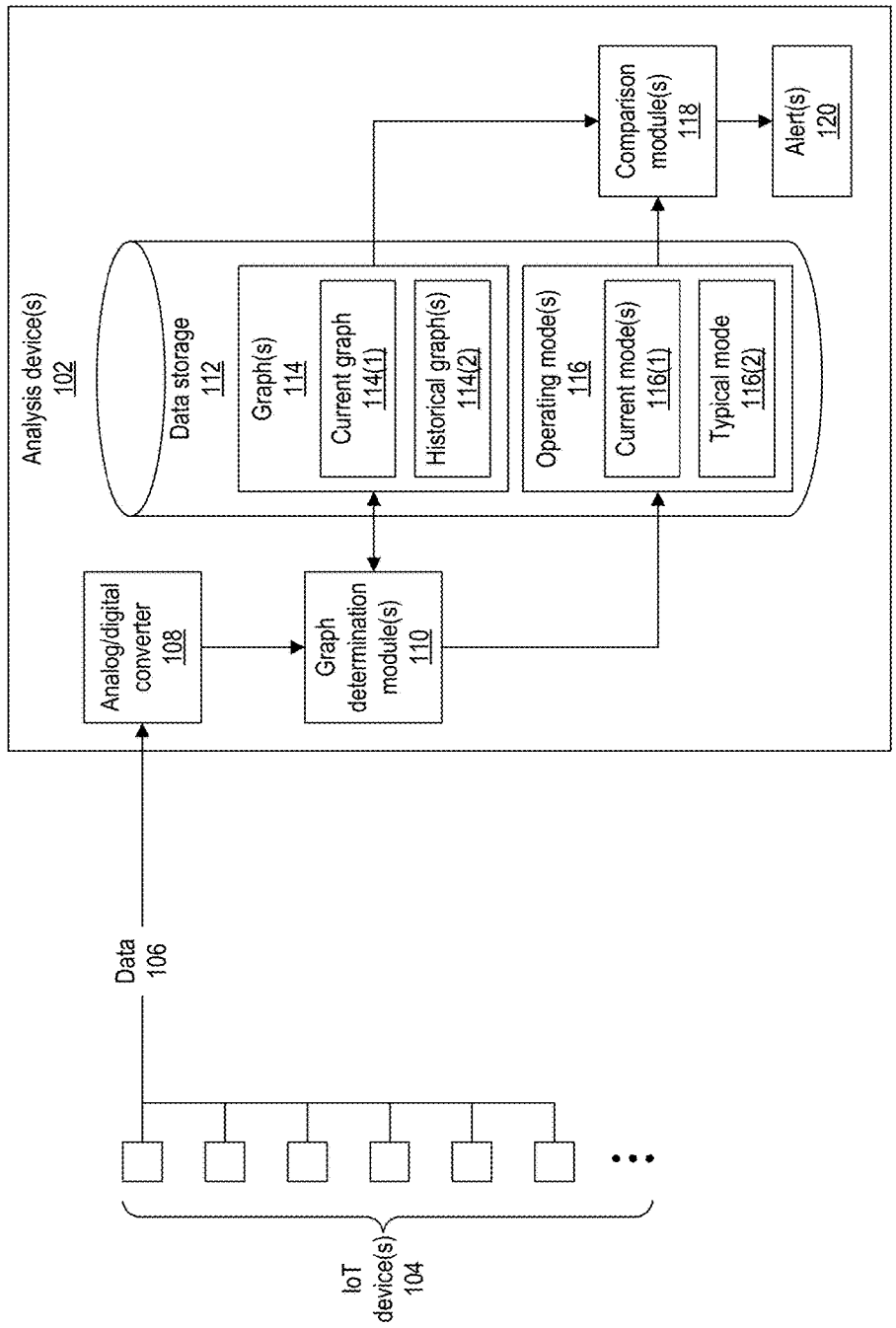
FIG. 1 depicts an example system for graph-based analysis of data for sensor networks, according to implementations of the present disclosure.

Implementations of the present disclosure are directed to systems, devices, methods, and computer-readable media for graph-based analysis of data generated on sensor networks, such as Internet-of-Things (IoT) networks. In some implementations, data is collected from various computing devices on a network. The devices may be IoT devices on an IoT network. The IoT device(s) may also be referred to as sensor(s) or sensor device(s), and the collected data may also be referred to as sensor data. In some implementations, the sensor data is discretized and analyzed to provide a graphical representation of at least a portion of the data, which may also be described as a graph. The graph is determined based on various relationships between nodes that correspond to discrete portions of the sensor data, and the relationships between nodes may be time-based correlations between the data of the nodes. For example, a first node may correspond to a particular value of a first element present in the data, such as a temperature value, and the second node may correspond to a particular value of a second element present in the data, such as a pressure value. An edge connecting the nodes may indicate that the particular temperature value and the particular pressure value were both measured in a system during at least one same time period. An edge may be associated with a counter that indicates a number of instances when the two connected nodes exhibited their corresponding data values during a same time period. Per the above example, an edge counter of five may indicate that the first temperature value and the second pressure value were measured in a system during five separate time periods. An edge counter may also be referred to as a frequency, a weight, or an energy of the edge.

A system may include any appropriate number of sensors that each generates a particular value of data during any appropriate number of time periods as the system is being monitored. The graph edges that exhibit the highest counter values may be identified, and the nodes connected by those graph edges may be designated as a typical operating mode for the system.

The graph accumulates, compresses, and organizes the data to enable data visualization, analysis, alert generation, and/or other activities to be performed more efficiently than traditional techniques for processing raw data from IoT devices. The accumulation of the sensor data in the graph may be versioned into time buckets such as hours, days, or weeks, and so forth, and the particular time period may depend on the particular domain in which the data was collected. The previously generated version of a graph may be compared to a current version to identify a changing situation, such as new usage of the monitored IoT devices, failure or anomalous behavior of the devices, and so forth.

In some implementations, the data collected from various sensors may be converted into data sets that include multiple discrete values, e.g., in time buckets of a predetermined time period. The nodes which have a particular set of data values during a particular time bucket may be selected and the edges that connect these nodes may have their counters incremented by one. If there is currently no node in the graph for a particular sensor value, a new node may be created and added to the graph. The counter for each edge connected a pair of nodes may indicate a frequency, or a number of instances, where the connected data values occur during a same time period. Such a frequency, or number of instances, may also be described as an energy of an edge. After the system has run for a time and the collected data has been arranged into the graph, a typical operating mode may be identified as the set of related nodes for which the edge counters have the highest value. Accordingly, the typical operating mode may be the set of data values which exhibit the highest frequency and/or highest number of instances of the data values occurring during a same time period. The typical operating mode may indicate a typical, common, normal, and/or more likely state of the system of IoT devices.

The graph may be stored and updated as additional sensor data is received, discretized into nodes, and compared to existing nodes and edges of the graph. In some implementations, the graph may be stored with a time stamp (e.g., date and/or time) indicating when the graph was generated or last updated. A detected change in the normal operating mode may indicate a different usage of the device(s) in the IoT, a failure of the device(s), and/or an anomalous operation of the device(s). Such a change may cause an alert to be sent to one or more users. Moreover, a different usage, failure, and/or anomalous operation may also be detected based on a deviation of the current state of system compared to the normal operating mode.

An IoT network may include any number of IoT devices that generate data, e.g., sensor data, and communicate the data to an IoT platform associated with the network. The IoT devices may also be referred to as sensors or sensor devices, and the generated data may also be referred to as sensor data. The IoT devices may include but are not limited to any of the following:

Environmental monitoring sensors and/or devices, such as air quality sensors, water quality sensors, soil quality sensors; sensors to measure air temperature, air pressure, wind speed and direction, water temperature, water pressure, water flow speed and direction, seismic vibration sensors, seismic (e.g., earthquake) warning systems, inclement weather (e.g., hurricane, tornado) warning systems, tsunami or flood warning systems, wildfire monitoring or warning systems, etc.;

Sensors and/or devices that monitor the state of a machine or system of machines that include mechanical, electrical, hydraulic, pneumatic, or other types of components, including sensors that detect one or more of: the position and/or orientation of components; the movement of components (e.g., velocity, acceleration, angular velocity, angular acceleration, etc.); the linear force (e.g., pressure) or angular force (e.g., torque) exerted by or on components; the temperature of components; the power, voltage, current, resistance, impedance, and/or other electrical properties of components; the current operational state of components (e.g., powered on, powered off, etc.); and so forth;

Infrastructure management systems, such as sensors and/or devices to measure the condition and/or maintenance status of buildings, roads, bridges, tunnels, railroads, airports, etc.;

Manufacturing systems, such as sensors and/or devices to monitor and/or control automated manufacturing processes, supply chain networks, shipping networks, etc.;

Energy management systems, such as sensors and/or devices to monitor the generation, distribution, storage, and/or usage of electrical power, natural gas, other petroleum-based fuels, and so forth, for a particular building, set of buildings, municipality, and/or larger area;

Portable computing devices, such as smartphones, tablet computers, electronic book readers, mobile gaming platforms, wearable computing devices, implanted computing devices, etc.;

Immobile and/or less readily portable computing devices, such as personal computers, laptop computers, mainframe computers, rack-mounted servers, etc.;

Media devices, such as televisions, audio output (e.g., stereo) systems, gaming platforms, digital video recording and/or playback devices, etc.;

Healthcare systems, such as sensors and/or devices for remote healthcare, health or biometric monitoring of individuals, emergency notification, and/or managing healthcare facilities such as hospitals, clinics, and so forth;

Building and/or home automation systems, including sensors and/or devices for monitoring and controlling electrical and/or mechanical devices in buildings, monitoring structural conditions of buildings, monitoring environment conditions in buildings (e.g., temperature, air quality, etc.), controlling lighting, air circulation, water, or other in-building systems, and so forth;

Building security systems, including sensors and/or devices for controlling building access, detecting unauthorized access, alarm systems, door lock systems, fire or smoke detectors, flood detectors, air quality sensors and/or warning systems, etc.;

Vehicle computers, such as telematics devices, on-board computing systems, vehicle sensors, smart vehicle components, etc.;

Transportation systems, including sensors and/or other devices for monitoring and/or controlling automobile traffic on roads, railway networks, air traffic, water traffic, and so forth, such as traffic sensors, stoplight cameras, vehicle speed sensors and/or cameras, toll collection systems, fleet management systems, fixed and/or mobile surveillance cameras, etc.; and/or Automated and/or AI-enabled personal assistant devices for the home or other environments.

FIG. 1 depicts an example system for graph-based analysis of data for sensor networks, according to implementations of the present disclosure. As shown in the example of FIG. 1, the system may include one or more analysis devices 102. The analysis device(s) 102 may include any suitable number and type of computing device(s). In some instances, the analysis device(s) 102 may include distributed computing device(s), e.g., cloud computing server(s). The system may also include any suitable number of IoT device(s) 104, each generating data 106 (e.g., sensor data). The data 106 may be communicated to the analysis device(s) 102 over one or more networks.

The analysis device(s) 102 may execute an analog/digital converter 108. The analog/digital converter 108 may receive the data 106 and discretize the data 106 into a number of time period buckets. For example, a device 104 may generate a stream of data that describes a temperature measurement, measured at a particular frequency, e.g., once per second. The converter 108 may process the temperature data 106 to determine, for each time period bucket, an average (or other composite) temperature value during the corresponding time period. For example, the converter 108 may determine the average of the temperature measurements over each 10 second bucket, and output a set of discrete values corresponding to 10 second periods.

Figure 2:
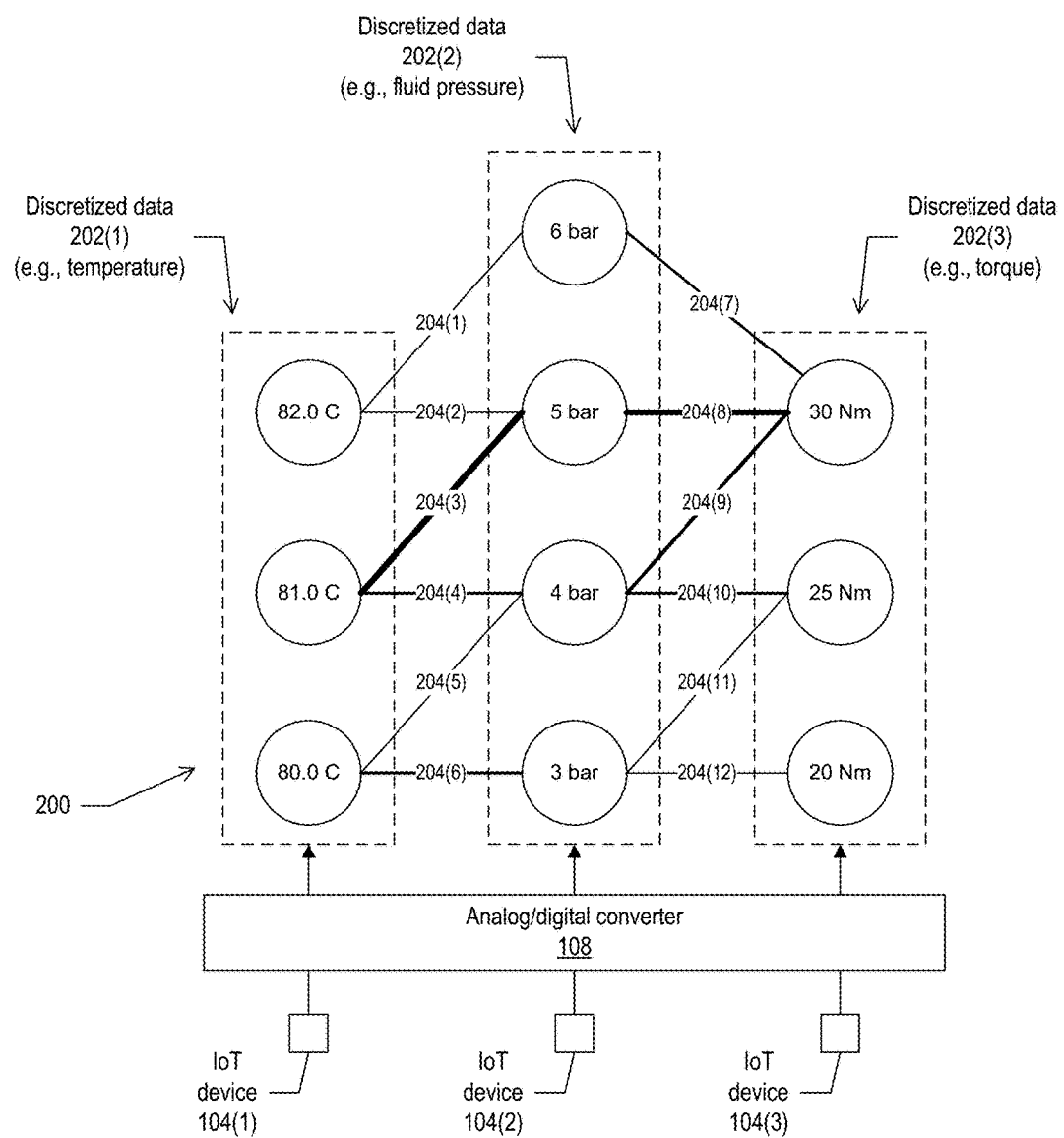
FIG. 2 depicts an example graph for analyzing data, according to implementations of the present disclosure.

The analysis device(s) 102 may execute one or more graph determination module(s) 110. The module(s) 110 may receive the discretized data from the converter 108, and determine a graph 114 based on the discretized data. An example of a graph 114 is shown in FIG. 2. Described briefly, the graph 114 may include any number of nodes, each of which corresponds to a particular value (or value range) of a particular attribute of the discretized data. The graph 114 may also include one or more edges each connecting a pair of nodes. A counter value of an edge may indicate the number of instances when a particular pair of data values were exhibited by the system of devices 104 within a particular time period, as described further herein.

The analysis device(s) 102 may include data storage 112 of any suitable type and/or configuration. In some instances, the data storage 112 may be external to the analysis device(s) 102 and accessible over one or more networks. The data storage 112 may store one or more graphs 114 determined by the graph determination module(s) 110. The graph(s) 114 may include a current graph 114(1), e.g., the most recently determined and/or updated graph 114 for the system of IoT device(s) 104. The graph(s) 114 may also include one or more historical graphs 114(2) that were previously determined for the system of IoT device(s) 104.

In some implementations, the graph determination module(s) 110 may also identify one or more operating modes 116 based on the determined graph(s) 114, and the mode(s) 116 may also be stored in the data storage 112. A mode 116 may describe any suitable number of graph nodes (e.g., data values) that are connected by edges within the graph. In some implementations, the graph determination module(s) 110 may identify, for a particular graph 114, a typical mode 116(2) for which the connecting edge(s) exhibit a maximum counter value. A typical mode 116(2) may be a maximum-value mode 116 that persists over a period of time as the graph 114 is updated with current data 106. Accordingly, the typical mode 116(2) may include the set of data values that describe a typical, normal, most common, and/or nominal state of the system of IoT device(s) 104. The operating mode(s) 116 may also include one or more current mode(s) 116(1) that are present in the current graph 114(1).

In some implementations, the analysis device(s) 102 may execute one or more comparison modules 118. The comparison module(s) 118 may compare the historically typical mode 116(2) or the highest-frequency current mode 116(1) to determine whether the system of IoT device(s) 104 is operating normally or abnormally. If the typical mode 116(2)

differs from the highest-frequency current mode 116(1) with a statistical difference that exceeds a predetermined threshold difference, a determination may be made that the system is operating in an atypical state, which may indicate a failure, error, or other problem. In such instances, the comparison module(s) 118 may generate and send one or more alerts 120. The alert(s) 120 may be sent to appropriate personnel and/or processes, to enable the recipient(s) to analyze and/or act in response to the anomalous operational state of the system. The alert(s) 120 may include information describing the particular deviation(s) of the system from the typical operating state. For example, if a typical mode 116(2) includes temperature X and the current highest-frequency mode 116(1) includes temperature Y, where X deviates from Y in excess of a threshold value, the alert 120 may indicate: the temperature Y and its deviation from temperature X, the time period(s) when this deviation occurred, the system in which the deviation occurred, other data values during those time period(s), and/or other information. The alert(s) 120 may be communicated using any suitable communication channel, such as through email, text message, voice mail message, push message, remote procedure call (RPC), other inter-process communications, and so forth.

In some implementations, the comparison module(s) 118 may compare a current graph 114(1) to one or more historical graph(s) 114(2) to determine whether current graph 114(1) deviates significantly from the previously generated historical graph(s) 114(2). If such a deviation is present, e.g., a statistical deviation that exceeds a predetermined threshold difference, then alert(s) 120 may be sent.

In some implementations, the various IoT device(s) 104, e.g., sensors, may be in a system that includes one or more mechanisms, machines, or devices. The device(s) 104 may be components of a larger machine, and each device 104 may generate data that describes some aspect of that machine. For example, within a wind turbine, a first device 104 may measure temperature, a second device 104 may measure power generated, a third device 104 may measure rotational speed, a fourth device 104 may measure external wind speed, and so forth. A typical mode 116(2) of the system may describe a most frequently occurring combination of those data values within the system. For example, the typical mode of a turbine may include particular values for temperature, power, rotational speed, wind speed, and so forth. Implementations may support the monitoring and analysis of data from any suitable type of system that includes any number of devices 104. Such systems may include vehicles, power generation systems, other utility support systems, smart home systems, and so forth.

Although the example of FIG. 1 shows the discretization performed by the converter 108 that is executing on the analysis device(s) 102, implementations are not so limited. In some implementations, the converter 108 may operate on one or more of the device(s) 104, such that the data 106 is discretized prior to being communicated to the analysis device(s) 102. Such implementations may reduce the amount of network capacity consumed compared to systems in which the raw data 106 is communicated over network(s) to be discretized on the analysis device(s) 102. In some implementations, the raw data 106 and/or discretized raw data 106 may be stored in the data storage 112. Alternatively, the raw data 106 and/or discretized raw data 106 may not be persisted, and the graph(s) 114 and/or operating mode(s) 116 information may be stored in the data storage 112. In such implementations, the graph-based analysis of the data 106 may be described as compression of the data 106. The data storage 112 may store information regarding all the operating mode(s) 116 identified in the graph(s) 114. Each mode 116 may include a particular set of nodes corresponding to data values, and the counter values for the various edges connecting the nodes.

In some implementations, the graph(s) 114 and/or mode(s) 116 may be dynamically updated as data 106 is received from the device(s) 104. A dynamic process may be performed, in response to a triggering event, without any unnecessary delay in performance beyond the inherent delay caused by network communication latency, processing time, and so forth. For example, receipt of a new set of data 106 from the device(s) 104 may cause the converter 108 and/or module(s) 110 to discretize and analyze the data 106, and to update the graph(s) 114 and/or operating mode(s) 116 for the system of device(s) 104.

FIG. 2 depicts an example graph 200 for analyzing data 106, according to implementations of the present disclosure. As shown in the example of FIG. 2, one or more IoT devices 104 may each generate data 106 which is discretized by the converter 108 to generate discretized data 202. Although FIG. 2 depicts three devices 104 generating data 106, the system may include any suitable number of devices 104. In the example of FIG. 2, a first device 104(1) is generating temperature data, a second device 104(2) is generating fluid pressure data, and a third device 104(3) is generating torque measurement data.

The converter 108 may generate discretized data 202 by identifying instances of particular values present in the data 106 during one or more time periods. In the example shown, the data includes three detected temperature values, four detected pressure values, and three detected torque measurement values. Each portion of discretized data 202 may be added to the graph 200 as a node in the graph 200, as shown. The graph 200 may also include one or more edges 204. The presence of an edge 204 indicates that the corresponding data values of the nodes connected by the edge were exhibited by the system within at least one particular time period. As described above, a counter value for an edge indicates the number of time periods when the corresponding data values were exhibited in the same time period. The counter value is depicted in FIG. 2 as a thickness of the edge(s) 204, with a thicker edge indicating a higher counter value.

In the example of FIG. 2, the typical operating mode 116(2) includes those data values for which the corresponding nodes are connected by edges 204 that exhibit the maximum counter value among the edges that connect nodes of a particular data type. For example, among the edges that connect temperature nodes and pressure nodes, the edge 204(3) exhibits the highest counter value, e.g., the edge connecting 81.0 C and 5 bar values for temperature and pressure respectively. Among the edges that connect pressure nodes and torque nodes, the edge 204(8) exhibits the highest counter value, e.g., the edge connecting the 5 bar and 30 Nm values for pressure and torque respectively. Accordingly, in this example the typical operating mode of the system may be the operational state in which the temperature is 81.0 C, the fluid pressure is 5 bar, and the torque is 30 Nm (newton-meters).

An edge may be present within any pair of nodes in the graph. In the example of FIG. 2, some possible edges are not shown for clarity. In some instances, a node (e.g., a possible data value) may not be present in the graph if that node is not connected by an edge to at least one other node, e.g., if that data value was not measured in the system during at least one time period. In some instances, there may be a relationship or dependency between the various data values in the nodes. For example, there may be a relationship between temperature, pressure, and/or torque as determined according to the particular configuration of the system and/or applicable physical laws.

The sampling time period for discretization of the data 106 may be based at least partly on the particular system that is being monitored, and/or the domain of the system. For example, for a wind turbine, it may be appropriate to discretize the data 106 into 3 minute time buckets, whereas for an automobile, it may be appropriate to discretize the data 106 into 10 second time buckets. In some instances, the number of occurrences of a node (e.g., the number of times a particular data value is measured) may be irrelevant and may not be tracked. Instead, the counter value of each of the edges may be tracked and stored as part of the graph data in the data storage 112.

Figure 3:
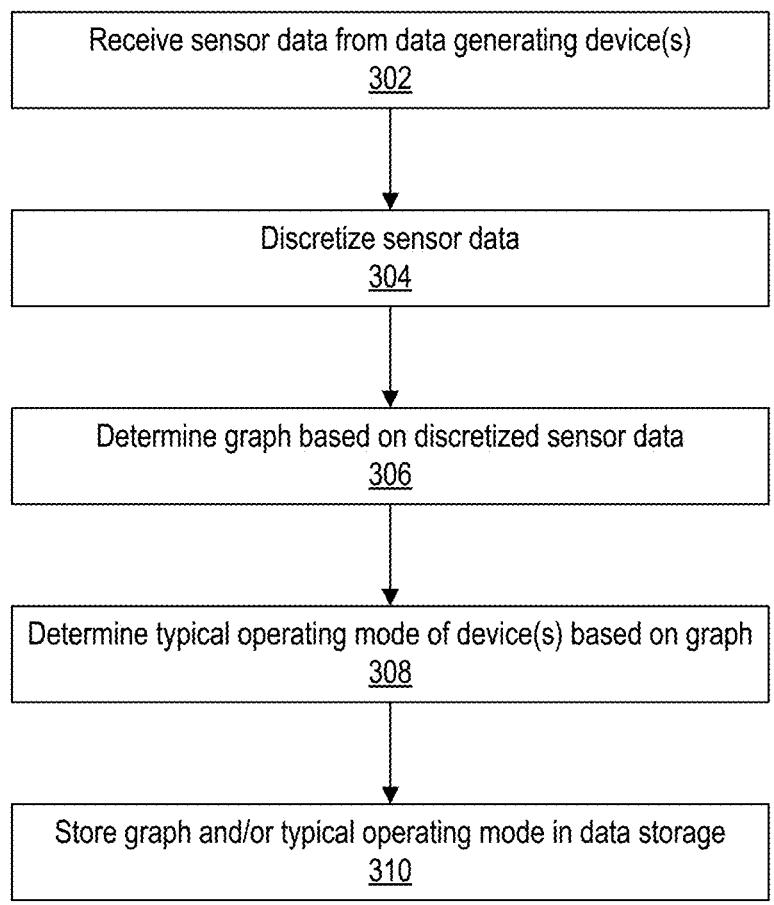
FIG. 3 depicts a flow diagram of an example process for determining a graph and a typical operating mode, according to implementations of the present disclosure.

FIG. 3 depicts a flow diagram of an example process for determining a graph and a typical operating mode, according to implementations of the present disclosure. Operations of the process may be performed by one or more of the analog/digital converter 108, the graph determination module(s) 110, the comparison module(s) 118, and/or other software module(s) executing on the analysis device(s) 102, the IoT device(s) 104, or elsewhere.

The sensor data 106 may be received (302) from the various data generating device(s) 104 in the system. The data 106 may be discretized (304), as described above, into time buckets. A graph 114 may be determined (306) based on the discretized sensor data 106. Based on the graph 114, a typical operating mode 116 of the system may be determined (308) as described above. Other mode(s) 116 may also be identified based on the graph 114, e.g., less frequently occurring modes. The various mode(s) 116 and/or the graph 114 may be stored (310) in data storage 112.

Figure 4:
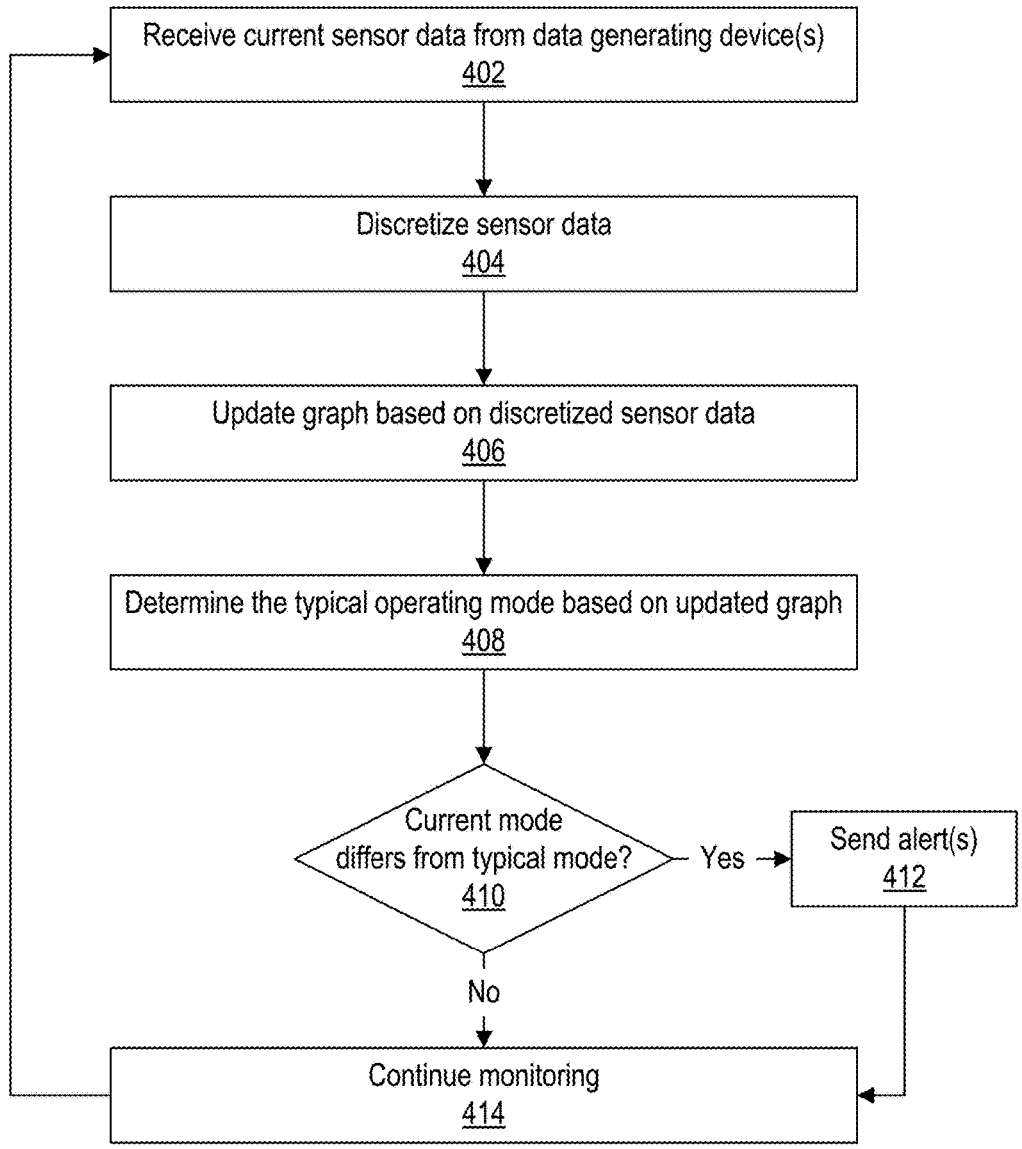
FIG. 4 depicts a flow diagram of an example process for generating alerts based on a detected difference of a graph and/or operating mode, according to implementations of the present disclosure.

FIG. 4 depicts a flow diagram of an example process for generating alerts based on a detected difference of a graph and/or operating mode, according to implementations of the present disclosure. Operations of the process may be performed by one or more of the analog/digital converter 108, the graph determination module(s) 110, the comparison module(s) 118, and/or other software module(s) executing on the analysis device(s) 102, the IoT device(s) 104, or elsewhere.

Current and/or recent sensor data 106 may be received (402) from the data generating device(s) 104. The data 106 may be discretized (404) as described above, and a previously generated graph 114 for the system of device(s) 104 may be updated (406) based on the discretized sensor data 406. Updating a graph may include incrementing each of the edges for which a corresponding pair of data values is present in the newly received discretized data 106. For example, if the graph already includes an edge B connecting the nodes corresponding to temperature X and pressure Y, and the newly received data includes temperature X and pressure Y, then the counter value for edge B may be incremented by one. If the graph does not already include nodes corresponding to temperature X and/or pressure Y, new node(s) may be added to the graph along with the appropriate edge(s) connecting those node(s) to other nodes. A newly added edge may be added with an initial counter value of one.

The typical operating mode of the updated graph may be determined (408), e.g., the mode with highest counter value edges. The updated graph may be examined to determine (410) whether the typical operating mode has changed since the previous generation of the graph. In some implementations, the determination may be made based on whether the typical mode differs from the previously determined typical mode by at least a predetermined threshold value. If so, one or more alerts 120 may be sent (412) as described above. After alert(s) 120 are sent (412), or if the typical mode has not changed (410), the process may continue monitoring the system and analyzing received data 106. In some instances, the steady state operation mode may be implicitly identified if the value from a model does not differ from the corresponding value from a predecessor historic model. Sending an alert may be based on static defined thresholds for deviation, and/or based on a percentage of deviation that triggers an alert. The measurement period for the alerting may be different based on the particular domain, in some cases through a measurement of the deviation from a model (e.g., graph) to a successor model.

In some systems, a typical operating mode may naturally change gradually over time. For example, the normal operating state of a machine may alter over time as parts degrade or for other reasons. Accordingly, in some implementations a below-threshold variation in the typical operating mode may be tolerated without sending alert(s) 120. In such instances, the updated version of the graph 114 and/or typical operating mode may be stored and tracked to account for any expected variations in operational state.

Figure 5:
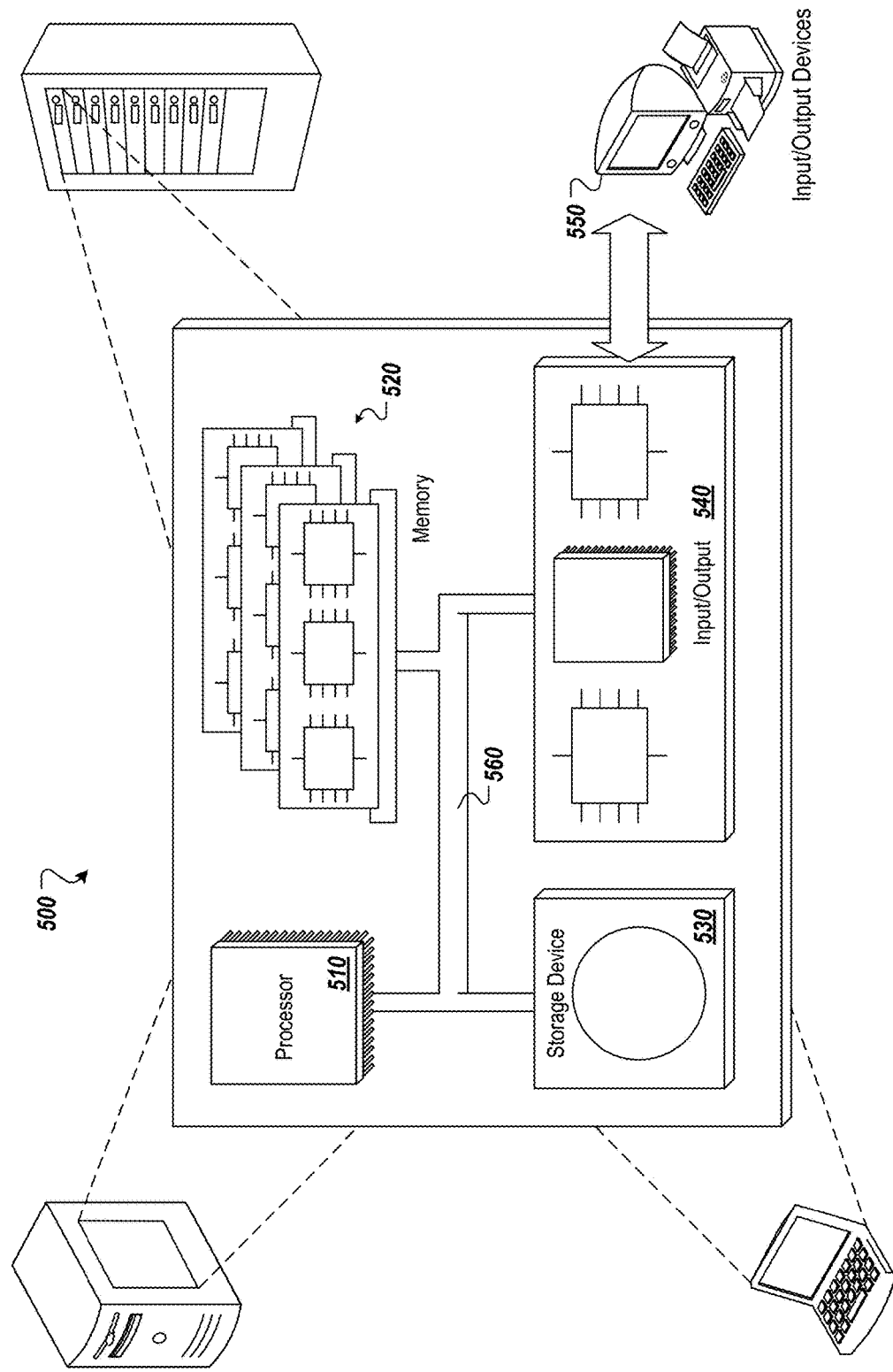
FIG. 5 depicts an example computing system, according to implementations of the present disclosure.

FIG. 5 depicts an example computing system, according to implementations of the present disclosure. The system 500 may be used for any of the operations described with respect to the various implementations discussed herein. For example, the system 500 may be included, at least in part, in one or more of the IoT device(s) 104, the analysis device(s) 102, and/or other computing device(s) or systems of device(s) described herein. The system 500 may include one or more processors 510, a memory 520, one or more storage devices 530, and one or more input/output (I/O) devices 550 controllable through one or more I/O interfaces 540. The various components 510, 520, 530, 540, or 550 may be interconnected through at least one system bus 560, which may enable the transfer of data between the various modules and components of the system 500.

The processor(s) 510 may be configured to process instructions for execution within the system 500. The processor(s) 510 may include single-threaded processor(s), multi-threaded processor(s), or both. The processor(s) 510 may be configured to process instructions stored in the memory 520 or on the storage device(s) 530. The processor(s) 510 may include hardware-based processor(s) each including one or more cores. The processor(s) 510 may include general purpose processor(s), special purpose processor(s), or both.

The memory 520 may store information within the system 500. In some implementations, the memory 520 includes one or more computer-readable media. The memory 520 may include any number of volatile memory units, any number of non-volatile memory units, or both volatile and non-volatile memory units. The memory 520 may include read-only memory, random access memory, or both. In some examples, the memory 520 may be employed as active or physical memory by one or more executing software modules.

The storage device(s) 530 may be configured to provide (e.g., persistent) mass storage for the system 500. In some implementations, the storage device(s) 530 may include one or more computer-readable media. For example, the storage device(s) 530 may include a floppy disk device, a hard disk device, an optical disk device, or a tape device. The storage device(s) 530 may include read-only memory, random access memory, or both. The storage device(s) 530 may include one or more of an internal hard drive, an external hard drive, or a removable drive.

One or both of the memory 520 or the storage device(s) 530 may include one or more computer-readable storage media (CRSM). The CRSM may include one or more of an electronic storage medium, a magnetic storage medium, an optical storage medium, a magneto-optical storage medium, a quantum storage medium, a mechanical computer storage medium, and so forth. The CRSM may provide storage of computer-readable instructions describing data structures, processes, applications, programs, other modules, or other data for the operation of the system 500. In some implementations, the CRSM may include a data store that provides storage of computer-readable instructions or other information in a non-transitory format. The CRSM may be incorporated into the system 500 or may be external with respect to the system 500. The CRSM may include read-only memory, random access memory, or both. One or more CRSM suitable for tangibly embodying computer program instructions and data may include any type of non-volatile memory, including but not limited to: semiconductor memory devices, such as EPROM, EEPROM, and flash memory devices; magnetic disks such as internal hard disks and removable disks; magneto-optical disks; and CD-ROM and DVD-ROM disks. In some examples, the processor(s) 510 and the memory 520 may be supplemented by, or incorporated into, one or more application-specific integrated circuits (ASICs).

The system 500 may include one or more I/O devices 550. The I/O device(s) 550 may include one or more input devices such as a keyboard, a mouse, a pen, a game controller, a touch input device, an audio input device (e.g., a microphone), a gestural input device, a haptic input device, an image or video capture device (e.g., a camera), or other devices. In some examples, the I/O device(s) 550 may also include one or more output devices such as a display, LED(s), an audio output device (e.g., a speaker), a printer, a haptic output device, and so forth. The I/O device(s) 550 may be physically incorporated in one or more computing devices of the system 500, or may be external with respect to one or more computing devices of the system 500.

The system 500 may include one or more I/O interfaces 540 to enable components or modules of the system 500 to control, interface with, or otherwise communicate with the I/O device(s) 550. The I/O interface(s) 540 may enable information to be transferred in or out of the system 500, or between components of the system 500, through serial communication, parallel communication, or other types of communication. For example, the I/O interface(s) 540 may comply with a version of the RS-232 standard for serial ports, or with a version of the IEEE 1284 standard for parallel ports. As another example, the I/O interface(s) 540 may be configured to provide a connection over Universal Serial Bus (USB) or Ethernet. In some examples, the I/O interface(s) 540 may be configured to provide a serial connection that is compliant with a version of the IEEE 1394 standard.

The I/O interface(s) 540 may also include one or more network interfaces that enable communications between computing devices in the system 500, or between the system 500 and other network-connected computing systems. The network interface(s) may include one or more network interface controllers (NICs) or other types of transceiver devices configured to send and receive communications over one or more networks using any network protocol.

Computing devices of the system 500 may communicate with one another, or with other computing devices, using one or more networks. Such networks may include public networks such as the internet, private networks such as an institutional or personal intranet, or any combination of private and public networks. The networks may include any type of wired or wireless network, including but not limited to local area networks (LANs), wide area networks (WANs), wireless WANs (WWANs), wireless LANs (WLANs), mobile communications networks (e.g., 3G, 4G, Edge, etc.), and so forth. In some implementations, the communications between computing devices may be encrypted or otherwise secured. For example, communications may employ one or more public or private cryptographic keys, ciphers, digital certificates, or other credentials supported by a security protocol, such as any version of the Secure Sockets Layer (SSL) or the Transport Layer Security (TLS) protocol.

The system 500 may include any number of computing devices of any type. The computing device(s) may include, but are not limited to: a personal computer, a smartphone, a tablet computer, a wearable computer, an implanted computer, a mobile gaming device, an electronic book reader, an automotive computer, a desktop computer, a laptop computer, a notebook computer, a game console, a home entertainment device, a network computer, a server computer, a mainframe computer, a distributed computing device (e.g., a cloud computing device), a microcomputer, a system on a chip (SoC), a system in a package (SiP), and so forth. Although examples herein may describe computing device(s) as physical device(s), implementations are not so limited. In some examples, a computing device may include one or more of a virtual computing environment, a hypervisor, an emulation, or a virtual machine executing on one or more physical computing devices. In some examples, two or more computing devices may include a cluster, cloud, farm, or other grouping of multiple devices that coordinate operations to provide load balancing, failover support, parallel processing capabilities, shared storage resources, shared networking capabilities, or other aspects.

Implementations and all of the functional operations described in this specification may be realized in digital electronic circuitry, or in computer software, firmware, or hardware, including the structures disclosed in this specification and their structural equivalents, or in combinations of one or more of them. Implementations may be realized as one or more computer program products, i.e., one or more modules of computer program instructions encoded on a computer readable medium for execution by, or to control the operation of, data processing apparatus. The computer readable medium may be a machine-readable storage device, a machine-readable storage substrate, a memory device, a composition of matter effecting a machine-readable propagated signal, or a combination of one or more of them. The term "computing system" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) may be written in any appropriate form of programming language, including compiled or interpreted languages, and it may be deployed in any appropriate form, including as a standalone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any appropriate kind of digital computer. Generally, a processor may receive instructions and data from a read only memory or a random access memory or both. Elements of a computer can include a processor for performing instructions and one or more memory devices for storing instructions and data. Generally, a computer may also include, or be operatively coupled to receive data from or transfer data to, or both, one or more mass storage devices for storing data, e.g., magnetic, magneto optical disks, or optical disks. However, a computer need not have such devices. Moreover, a computer may be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in, special purpose logic circuitry.

To provide for interaction with a user, implementations may be realized on a computer having a display device, e.g., a CRT (cathode ray tube) or LCD (liquid crystal display) monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any appropriate form of sensory feedback, e.g., visual feedback, auditory feedback, or tactile feedback; and input from the user may be received in any appropriate form, including acoustic, speech, or tactile input.

Implementations may be realized in a computing system that includes a back end component, e.g., as a data server, or that includes a middleware component, e.g., an application server, or that includes a front end component, e.g., a client computer having a graphical UI or a web browser through which a user may interact with an implementation, or any appropriate combination of one or more such back end, middleware, or front end components. The components of the system may be interconnected by any appropriate form or medium of digital data communication, e.g., a communication network. Examples of communication networks include a local area network ("LAN") and a wide area network ("WAN"), e.g., the Internet.

The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the disclosure or of what may be claimed, but rather as descriptions of features specific to particular implementations. Certain features that are described in this specification in the context of separate implementations may also be implemented in combination in a single implementation. Conversely, various features that are described in the context of a single implementation may also be implemented in multiple implementations separately or in any suitable subcombination. Moreover, although features may be described above as acting in certain combinations and even initially claimed as such, one or more features from a claimed combination may in some examples be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products.

A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

What is claimed is:

1. A computer-implemented method for detecting a change in operation of at least one of a plurality of devices in a network, the method performed by at least one processor, the method comprising:
receiving, by the at least one processor, data generated by a plurality of devices in the network;
generating, by the at least one processor, based on the data, a graph that includes: i) nodes, and ii) edges connecting pairs of nodes, wherein:
each of the nodes corresponds to a different value, or a different range of values, of the data;
each of the edges connects a pair of nodes for which corresponding values, or ranges of values, are present in the data during a same time period; and each of the edges is associated with a counter value that indicates a number of time periods during which the corresponding values, or ranges of values, are present in the data;

identifying, by the at least one processor, based on the generated graph, a typical operating mode of the plurality of devices, the typical operating mode including a set of values corresponding to nodes for which the connecting edges exhibit a highest counter value;

storing, by the at least one processor, the typical operating mode in data storage;

generating, by the at least one processor, an updated version of the graph that is based on updated data generated by the plurality of devices;

identifying, by the at least one processor, a change from the typical operating mode based on a comparison between the updated graph and the previously generated graph;

in response to the identification, generating, by the at least one processor, at least one alert that describes the change from the typical operating mode of the plurality of devices; and transmitting the generated at least one alert to at least one user or process associated with the network.

2. The method of claim 1, wherein each of the plurality of devices generates a different type of the data.

3. The method of claim 1, wherein the plurality of devices are components of a machine and are configured to generate the data that describes a plurality of attributes of the machine.

4. The method of claim 1, further comprising:
discretizing, by the at least one processor, the data according to a plurality of time periods.

5. The method of claim 1, further comprising:
storing, by the at least one processor, the graph in the data storage.

6. The method of claim 1, further comprising:
receiving, by the at least one processor, the updated data generated by the plurality of devices.

7. The method of claim 1, wherein the at least one alert is sent in response to determining that the updated version of the graph exhibits the typical operating mode that differs by at least a predetermined threshold value compared to the stored typical operating mode.

8. The method of claim 1, wherein the at least one alert indicates at least one current data value, in the updated data, that is different than a corresponding data value included in the stored typical operating mode.

9. The method of claim 1, wherein the plurality of devices is a plurality of Internet-of-Things (IoT) devices.

10. A system, comprising:
at least one processor; and
a memory communicatively coupled to the at least one processor, the memory storing instructions which, when executed by the at least one processor, cause the at least one processor to perform operations for detecting a change in operation of at least one of a plurality of devices in a network, the operations comprising:
receiving data generated by a plurality of devices in the network;
generating based on the data, a graph that includes: i) nodes, and ii) edges connecting pairs of nodes, wherein:
each of the nodes corresponds to a different value, or a different range of values, of the data;
each of the edges connects a pair of nodes for which corresponding values, or ranges of values, are present in the data during a same time period; and
each of the edges is associated with a counter value that indicates a number of time periods during which the corresponding values, or ranges of values, are present in the data;
identifying, based on the generated graph, a typical operating mode of the plurality of devices, the typical operating mode including a set of values corresponding to nodes for which the connecting edges exhibit a highest counter value;
storing the typical operating mode in data storage;
generating an updated version of the graph that is based on updated data generated by the plurality of devices;
identifying, by the at least one processor, a deviance from the typical operating mode based on a comparison between the updated graph and the previously generated graph;
in response to the identification, generating at least one alert that describes the deviance from the typical operating mode of the plurality of devices; and
transmitting the generated at least one alert to at least one user or process associated with the network.

11. The system of claim 10, wherein each of the plurality of devices generates a different type of the data.

12. The system of claim 10, wherein the plurality of devices are components of a machine and are configured to generate the data that describes a plurality of attributes of the machine.

13. The system of claim 10, the operations further comprising:
discretizing the data according to a plurality of time periods.

14. The system of claim 10, the operations further comprising:
storing the graph in the data storage.

15. The system of claim 10, the operations further comprising:
receiving the updated data generated by the plurality of devices.

16. One or more computer-readable media storing instructions which, when executed by at least one processor, cause the at least one processor to perform operations for detecting a change in operation of at least one of a plurality of devices in a network, the operations comprising:
receiving data generated by a plurality of devices;
generating based on the data, a graph that includes: i) nodes, and ii) edges connecting pairs of nodes, wherein:
each of the nodes corresponds to a different value, or a different range of values, of the data;
each of the edges connects a pair of nodes for which corresponding values, or ranges of values, are present in the data during a same time period; and
each of the edges is associated with a counter value that indicates a number of time periods during which the corresponding values, or ranges of values, are present in the data;
identifying, based on the generated graph, a typical operating mode of the plurality of devices, the typical operating mode including a set of values corresponding to nodes for which the connecting edges exhibit a highest counter value;
storing the typical operating mode in data storage;

generating an updated version of the graph that is based on updated data generated by the plurality of devices;

identifying a deviance from the typical operating mode based on a comparison between the updated graph and the previously generated graph;

in response to the identification, generating at least one alert that describes the deviance from the typical operating mode of the plurality of devices; and transmitting the generated at least one alert to at least one user or process associated with the network.

17. The one or more computer-readable media of claim 16, the operations further comprising:

receiving the updated data generated by the plurality of devices.

18. The one or more computer-readable media of claim 16, wherein the at least one alert is sent in response to determining that the updated version of the graph exhibits the typical operating mode that differs by at least a predetermined threshold value compared to the stored typical operating mode.

19. The one or more computer-readable media of claim 16, wherein the at least one alert indicates at least one current data value, the updated data, that is different than a corresponding data value included in the stored typical operating mode.

20. The one or more computer-readable media of claim 16, wherein the plurality of devices is a plurality of Internet-of-Things (IoT) devices.

* * * * *